Patented Nov. 6, 1945

2,388,255

UNITED STATES PATENT OFFICE 2,388,255

STABILIZED ORGANIC SUBSTANCES AND METHOD OF STABILIZING SAME

Morris H. Daskais and Ellis K. Fields, Chicago, Ill., assignors to Research Corporation, a corporation of New York No Drawing. Original application January 16, 1943, Serial No. 472,598. Divided and this application February 15, 1943, Serial No. 475,938

11 Claims. (Cl. 44—73)

This invention relates to the stabilization of organic substances subject to deterioration by the action of oxygen and, in particular, to the stabilization and preservation of organic substances, especially oxidizable mineral hydrocarbons, wherein the substances contain or are brought in contact with certain metals and their compounds which accelerate the oxidizing action and hasten the deterioration of the organic substances. It also relates to the resulting stabilized products.

This application is a division of our copending application entitled "Organic compounds and method of making same," Serial No. 472,598, filed January 16, 1943.

Many organic substances such as gasoline, lubricating oils, sulfonated and sulfated oils, essential oils, fats, soaps, rubber, photographic developers, silk, wool, cellulose products and the like are subject to oxidation and consequent deterioration. Antioxidants are usually incorporated in these organic substances to retard to a considerable extent the reaction of these substances with oxygen. In the presence of even very minute amounts of certain metals and metallic compounds, especially copper, iron, chromium and lead, and their compounds, which appear to function as oxidation promoters when in contact with organic substances, the effect of antioxidants is decreased, and may be overcome entirely, so that the organic substances react with oxygen as rapidly as, if not more rapidly than, if an antioxidant were not present.

The use of metal deactivators for the purpose described herein is known; however, most of the compounds proposed for this purpose have not been particularly effective. The most effective ones heretofore proposed, in so far as we are aware, consist of the products of condensation of (a) one molecule of an aliphatic polyamine and two molecules of an ortho hydroxy aromatic aldehyde or ketone; and (b) one molecule of a polyamino compound and at least two molecules of a 1,3 or beta diketone.

We have found that organic substances of the character described are more effectively stabilized and preserved by incorporating in these substances a reaction product of an alpha isonitroso carbonyl compound and an organic polyamine. These reaction products or compounds, while present in the organic substances, suppress and neutralize the pro-oxidant effect of the metals and their compounds on organic substances and enhance the efficiency of anti-oxidants when these latter are also present in the organic substances.

Only small amounts of these compounds are essential to accomplish this purpose, varying generally from about 0.005% to about ½ of 1%. Larger amounts can, of course, be used. The amounts to be used are dependent, in part, upon the particular organic substance into which the compounds are to be incorporated, the presence or absence of an antioxidant, the amount of pro-oxidant metal in the organic substance and the stability requirements of the treated organic substance. For most purposes, about 0.009% to about 0.25% is sufficient. The compounds are added to organic substances to be stabilized in solid or liquid form, mixed with other addition agents, dissolved in a solvent, or in any other desired form.

The compounds used in accordance with the present invention may be produced by reacting an alpha isonitroso carbonyl compound such as an alpha isonitroso ketone or substituted alpha isonitroso ketone with an organic polyamino compound in the proportion of at least two molecules of the former to one of the latter, as fully described in our copending application referred to above. The resulting product is an isonitroso ketone-polyamino compound reaction product in which nitrogen atoms are doubly bonded to the carbonyl carbon atoms of the ketone groups and singly bonded to carbon atoms of the hydrocarbon radical. Since the methods of preparing these compounds form no part of the present invention they will not be described herein.

The alpha isonitroso ketone compounds exist in tautomeric form and either or both of these tautomers may be used as a reactant. These tautomers have the following general formulae:

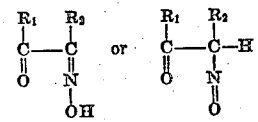

wherein $R_1$ and $R_2$ represent radicals selected from the group consisting of alkyl, aryl, aralkyl, acyl, carbalkoxy, cyclic or heterocyclic radicals, and wherein $R_2$ may also be hydrogen, and where the group

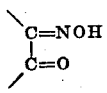

may occur as part of a chain or a cyclic or heterocyclic ring and wherein the carbon atoms of the $R_1$ and $R_2$ groups may be connected directly to each other or through an atom or group of atoms which may include C, O, N, S, etc.

Some examples of such compounds are alpha isonitroso methyl ethyl ketone, isonitroso acetone, alpha isonitroso camphor, alpha isonitroso aceto-acetic esters, alpha isonitroso acetophenone, alpha isonitroso acetyl acetone, alpha isonitroso cyclohexanone, alpha isonitroso methyl propyl ketone, alpha isonitroso methyl amyl ketone, alpha isonitroso xylyl undecyl ketone, alpha isonitroso acetonaphthone, alpha isonitroso aceto pyridine, etc.

The polyamino compounds referred to are aliphatic or aromatic di- and higher polyamines, preferably containing at least two primary amino groups attached directly to different carbon atoms of the carbon chain. The carbon chain may contain other atoms such as nitrogen, oxygen or sulfur. The amino groups may be attached directly to different carbon atoms as already pointed out or to different carbon atoms of the carbon chain which are connected by nitrogen, oxygen or sulfur linkages.

Examples of such polyamino compounds are ethylene diamine, 1,2-propylene diamine, 1,3-propylene diamine, 3,4 hexane diamine, diethylene triamine, triethylene tetramine, tetraethylene pentamine, ortho phenylene diamine, 1,2-diamino cyclohexane, 1,3-diamino isopropanol, diamino diethyl ether, diamino diethyl sulfide, etc.

Amongst the alpha isonitroso carbonyl compound-polyamino compound reaction products which we have found to be especially effective as stabilizers and preservers in accordance with the present invention are:

Di-(isonitroso acetone) ethylene diamine $$CH_3-C=N-CH_2-CH_2-N=C-CH_3$$
$$H-C=N-OH \quad HO-N=C-H$$

Di-(alpha isonitroso methyl ethyl ketone) ethylene diamine $$CH_3-C=N-CH_2-CH_2-N=C-CH_3$$
$$CH_3-C=N-OH \quad HO-N=C-CH_3$$

Di-(alpha isonitroso methyl ethyl ketone) propylene diamine

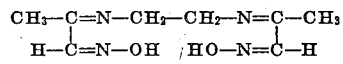

Di-(isonitroso acetone) diethylene triamine $$CH_3-C=N-CH_2-CH_2-NH-CH_2-CH_2-N=C-CH_3$$
$$H-C=N-OH \quad\quad\quad HO-N=C-H$$

Di-(isonitroso acetone) triethylene tetramine $$CH_3-C=N-CH_2-CH_2-NH-CH_2-CH_2-NH-CH_2-CH_2-N=C-CH_3$$
$$H-C=N-OH \quad\quad\quad\quad\quad HO-N=C-H$$

Di-(alpha isonitroso methyl ethyl ketone) diethylene triamine $$CH_3-C=N-CH_2-CH_2-NH-CH_2-CH_2-N=C-CH_3$$
$$CH_3-C=N-OH \quad\quad\quad HO-N=C-CH_3$$

Di-(alpha isonitroso acetoacetic ester) ethylene diamine

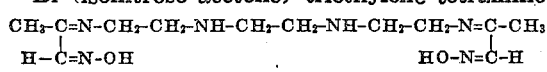

Di-(alpha isonitroso camphor) ethylene diamine

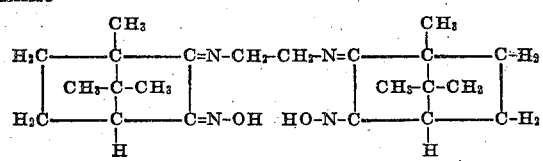

While all of the foregoing compounds are reaction products of two molecules of an isonitroso ketone and one molecule of an organic polyamino compound, our invention is not to be construed as limited to the use of such compounds since modified forms of such compounds as well as derivatives thereof may also be used. Thus, modified isonitroso ketone-polyamino reaction products produced by reacting one molecule of an ortho-hydroxy aldehyde or ketone or one molecule of a 1,3-diketone and at least one molecule of an isonitroso ketone with one molecule of an organic polyamino compound may be used. The following are examples of such compounds:

N-(alpha isonitroso methyl ethyl ketone)-N'-(ortho-hydroxy acetophenone)-ethylene diamine

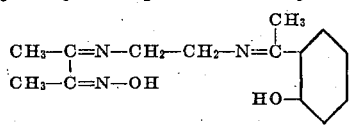

N-(alpha isonitroso methyl ethyl ketone)-N'-(acetyl acetone)-ethylene diamine

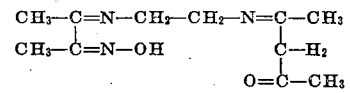

Derivatives of the isonitroso ketone-polyamino reaction products produced by reacting the reaction product with another organic compound, for example, with an acid chloride or ester such as stearoyl chloride, methyl stearate or ethyl stearate, to obtain an N-disubstituted amide may also be used. The reaction may be represented by the following equation:

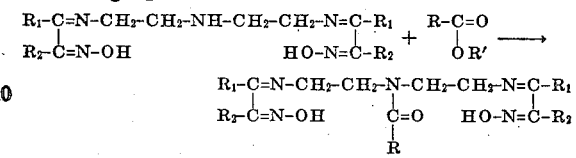

The compounds used in accordance with the present invention were tested on gasoline in accordance with A. S. T. M. method D525-41T for the gum stability of gasoline. The test gasoline contained an antioxidant, but no deactivator and had an induction period of 120 minutes. Just before the test 1 part per million of copper in the form of copper stearate was added to the gasoline, as well as the deactivator to be tested. The results of some tests are shown in Table I.

*Table I*

| Deactivator added 5 mg./50 cc. gasoline | Induction period, minutes |
|---|---|
| None | 15 |
| Di-(isonitroso acetone) diethylene triamine | 90 |
| Di-(alpha isonitroso methyl ethyl ketone) ethylene diamine | 108 |
| Di-(alpha isonitroso methly ethyl ketone) diethylene triamine | 90 |
| Di-(alpha isonitroso acetoacetic ester) ethylene diamine | 90 |
| None | 15 |

The above table illustrates the effectiveness of the compounds named in the table and of other alpha isonitroso compounds in suppressing the pro-oxidant effect of copper on hydrocarbons, in general, as well as on other oxidizable organic substances.

We claim:
1. The method of increasing the stability of an organic substance subject to deterioration through oxidation while in contact with a metallic oxidation promoter comprising incorporating in said substance a small amount of the condensation reaction product of two molecules of an alpha isonitroso ketone with one molecule of an organic polyprimary amine.

2. The method of increasing the stability of an organic substance subject to deterioration through oxidation while in contact with a metallic oxidation promoter comprising incorporating in said substance a small amount of the condensation reaction product obtained by reacting one molecule of an alpha isonitroso ketone and one molecule of an ortho-hydroxy aromatic carbonyl compound with one molecule of an organic polyprimary amine.

3. An organic substance of improved oxidation stability in contact with metallic oxidation promoters having incorporated therein a small proportion of the condensation reaction product obtained by reacting one molecule of an alpha isonitroso ketone and one molecule of an ortho-hydroxy aromatic carbonyl compound with one molecule of an organic polyprimary amine.

4. An organic substance of improved oxidation stability in contact with metallic oxidation promoters having incorporated therein a small proportion of di-(alpha isonitroso methyl ethyl ketone) ethylene diamine.

5. An organic substance of improved oxidation stability in contact with metallic oxidation promoters having incorporated therein a small proportion of di-(alpha isonitroso methyl ethyl ketone) propylene diamine.

6. An organic substance of improved oxidation stability in contact with metallic oxidation promoters having incorporated therein a small proportion of di-(alpha isonitroso methyl ethyl ketone) diethylene triamine.

7. An organic substance of improved oxidation stability in contact with metallic oxidation promoters having incorporated therein a small proportion of an alpha isonitroso carbonyl compound-polyamine compound reaction product formed by reacting two molecules of an alpha isonitroso ketone with one molecule of an organic poly-primary amine.

8. An organic substance of improved oxidation stability in contact with metallic oxidation promoters having incorporated therein a small proportion of an isonitroso carbonyl compound-polyamino compound reaction product formed by reacting two molecules of an alpha isonitroso ketone with one molecule of an aliphatic polyprimary amine.

9. An organic substance of improved oxidation stability in contact with metallic oxidation promoters having incorporated therein a small proportion of the condensation reaction product obtained by reacting one molecule of an alpha isonitroso ketone and one molecule of a carbonyl compound selected from the class consisting of an orthohydroxy aromatic ketone, an ortho-hydroxy aromatic aldehyde and 1,3-diketone with one molecule of an organic polyprimary amine.

10. Gasoline containing an antioxidant having incorporated therein a small quantity of di-(alpha isonitroso methyl ethyl ketone) ethylene diamine as a stabilizer against oxidation promoting metals.

11. Gasoline containing an antioxidant having incorporated therein a small quantity of di-(alpha isonitroso methyl ethyl ketone) diethylene triamine as a stabilizer.

ELLIS K. FIELDS.
MORRIS H. DASKAIS.